United States Patent
Tapaninen (10) Patent No.: US 11,146,432 B2
(45) Date of Patent: Oct. 12, 2021

(54) RADIO SIGNAL DETECTION

(71) Applicant: Nordic Semiconductor ASA, Trondheim (NO)

(72) Inventor: Jukka Tapaninen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/972,192

(22) PCT Filed: Jun. 6, 2019

(86) PCT No.: PCT/EP2019/064889
§ 371 (c)(1),
(2) Date: Dec. 4, 2020

(87) PCT Pub. No.: WO2019/234199
PCT Pub. Date: Dec. 12, 2019

(65) Prior Publication Data
US 2021/0234735 A1    Jul. 29, 2021

(30) Foreign Application Priority Data
Jun. 8, 2018   (GB) ...................................... 1809428

(51) Int. Cl.
*H04L 27/00*   (2006.01)
*H04L 5/00*    (2006.01)

(52) U.S. Cl.
CPC ........ *H04L 27/0014* (2013.01); *H04L 5/0007* (2013.01); *H04L 2027/0026* (2013.01); *H04L 2027/0067* (2013.01)

(58) Field of Classification Search
CPC .......................... H04L 27/2675; H04L 27/2678
See application file for complete search history.

(56) References Cited

U.S. PATENT DOCUMENTS 8,938,016 B1    1/2015  Ben-Eli et al.
2006/0014494 A1  1/2006  Vanderperren et al.
(Continued)

FOREIGN PATENT DOCUMENTS

DE   10 2012 200 319 A1   4/2013
KR      10-1838222 B1      3/2018
WO   WO 2018/036611 A1     3/2018

OTHER PUBLICATIONS

IPO Search Report under Section 17(5) for GB1809428.4, dated Nov. 23, 2018, 3 pages.
(Continued)

*Primary Examiner* — Kevin Kim
(74) *Attorney, Agent, or Firm* — Klarquist Sparkman, LLP (57) ABSTRACT

A radio receiver is provided for low-power detection of a radio signal, wherein said receiver is configured to receive a radio signal over a radio network; convert at least part of the received radio signal into a sequence of samples; compare the similarity of a first part of the sequence and a second part of the sequence, wherein the first part and the second part are of equal length; and in response to said similarity being greater than a similarity threshold: detect a phase difference between the first part of the sequence and the second part of the sequence; calculate a frequency offset between a frequency of the received radio signal and an expected frequency of the received radio signal using said phase difference; and use said calculated frequency offset to attempt full access to the radio network.

22 Claims, 7 Drawing Sheets

(56) References Cited

U.S. PATENT DOCUMENTS

| | | | | |
|---|---|---|---|---|
| 2009/0190465 A1* | 7/2009 | Porat | .................. | H04L 27/2647 |
| | | | | 370/210 |
| 2010/0097950 A1 | 4/2010 | Jeon | | |
| 2016/0020936 A1* | 1/2016 | Hu | ...................... | H04L 27/2657 |
| | | | | 375/260 |
| 2017/0288932 A1* | 10/2017 | Kang | .................. | H04L 27/2082 |

OTHER PUBLICATIONS

International Search Report and Written Opinion for PCT/EP2019/064889, dated Sep. 11, 2019, 13 pages.

* cited by examiner

RADIO SIGNAL DETECTION

CROSS REFERENCE TO RELATED APPLICATIONS

This is the U.S. National Stage of International Application No. PCT/EP2019/064889, filed Jun. 6, 2019, which was published in English under PCT Article 21(2), which in turn claims the benefit of Great Britain Application No. 1809428.4, filed Jun. 8, 2018.

TECHNICAL FIELD

The present invention relates to radio network access and network synchronization in low-power radio devices.

BACKGROUND

Radio communication devices which do not have an active connection to a radio network typically try repeatedly to access the network to ensure that when a network is available connection can be automatically established. Network access attempts generally use relatively sophisticated and complex techniques having high computational processing requirements as well as high power consumption. For example, a radio device may generate a local reference signal similar to a signal expected from the network and then perform a correlation between the local signal and any actual received signals to determine if the received signal is from the relevant network.

Moreover, generally in radio receivers, there is a slight difference between the expected nominal frequency of the signal from the network and the actual frequency of the received signal, and this is referred to as "frequency offset". As in many cases the success of the above-mentioned correlation will depend on the frequency of the local signal closely matching that of the received signal, it is typically necessary to generate a number of different local signals of different frequencies corresponding to different frequency offsets and attempt correlation of each of these with the received signal. Each of the different frequency local signals is known as a "frequency offset hypothesis".

As will be appreciated from the above, such network access techniques have high power requirements and so the regularity at which a radio device attempts network access is of importance. Each access attempt will carry a cost in terms of power consumption but infrequent attempts to access a network result in a longer delay in network access when the radio device, for example, moves from a region of no coverage to a region where there is coverage.

Therefore, in setting the regularity of network access attempts, there is a trade-off between power consumption and speed of signal acquisition. This trade-off is often referred to as "the container problem". A radio receiver may remain a long time out of the range of a useful radio signal, for example, during transportation in a ship ("container") out at sea. During this time, it may consume a lot of energy by trying to access a non-existent network. Thus, it would be advantageous to reduce this energy consumption, but attempting to access a network with low regularity will increase the time it takes to access a network when a network actually does become available.

There is a need, therefore, for a radio network access system that both consumes relatively little power while at the same time having fast network signal acquisition.

SUMMARY OF INVENTION

When viewed from a first aspect, the present invention provides a radio receiver configured to:
 receive a radio signal over a radio network;
 convert at least part of the received radio signal into a sequence of samples;
 compare a first part of the sequence and a second part of the sequence to determine a similarity, wherein the first part and the second part are of equal length; and
 in response to said similarity being greater than a similarity threshold, attempt full access to the radio network.

The first aspect of the invention extends to a method for detecting a radio signal, said method comprising:
 receiving a radio signal over a radio network;
 converting at least part of the received radio signal into a sequence of samples;
 comparing a first part of the sequence and a second part of the sequence to determine a similarity, wherein the first part and the second part are of equal length; and
 in response to said similarity being greater than a similarity threshold, attempting full access to the radio network.

When viewed from a second aspect, the present invention provides a radio receiver configured to:
 receive a radio signal over a radio network;
 convert at least part of the received radio signal into a sequence of samples;
 compare a first part of the sequence and a second part of the sequence to determine a similarity, wherein the first part and the second part are of equal length; and
 in response to said similarity being greater than a similarity threshold:
 detect a phase difference between the first part of the sequence and the second part of the sequence;
 calculate a frequency offset between a frequency of the received radio signal and an expected frequency of the received radio signal using said phase difference; and
 use said calculated frequency offset to attempt full access to the radio network.

The second aspect of the invention extends to a method for detecting a radio signal, said method comprising:
 receiving a radio signal over a radio network;
 converting at least part of the received radio signal into a sequence of samples;
 comparing a first part of the sequence and a second part of the sequence to determine a similarity, wherein the first part and the second part are of equal length; and
 in response to said similarity being greater than a similarity threshold:
 detecting a phase difference between the first part of the sequence and the second part of the sequence;
 calculating a frequency offset between a frequency of the received radio signal and an expected frequency of the received radio signal using said phase difference; and
 using said calculated frequency offset to attempt full access to the radio network.

It will be seen by those skilled in the art that in accordance with the invention there may be provided a simple way of establishing the presence of a particular type of radio signal that does not require the generation of a local reference signal or the use of complex correlation techniques used in conjunction with the local signal to detect the radio signal. As such, it may provide a low-power mechanism to detect the presence of a signal of interest.

By using the low-power trigger mechanism instead, the required regularity of attempts to perform full network access can be reduced. The low-power trigger mechanism determines if any useful signal exists before commencing full access or synchronization to the network. As such full network access attempts generally consume a lot computational power and battery power, by reducing the regularity of full network access attempts a significant saving in computational and battery power is made.

Further, with the present scheme, the trade-off between power consumption and speed of signal acquisition is less of a problem. As the method consumes relatively low power, the method can be performed relatively often or even constantly. As the method can be performed often, the speed of signal acquisition is increased when, for example, moving out of a region with low network coverage to a region with high network coverage.

This means that both low power consumption and high speed of signal acquisition are possible at the same time, without one being sacrificed for the other. Thus, the "container problem" may be at least partly overcome.

The step of comparing the similarity of a first part of the sequence with a second part of the sequence works as a low-power trigger mechanism to detect those types of radio signals that comprise duplicated parts. An example of a radio signal type that uses duplicated parts is the Orthogonal Frequency Division Multiplexing (OFDM) modulated radio signal. These typically use a "cyclic prefix". A cyclic prefix is formed by copying the last part of a sequence of samples and inserting the copied samples at the beginning of the sequence, thus creating a duplicated part in the OFDM signal.

In a set of embodiments the first part of the sequence of samples is a plurality of samples at the beginning of the sequence of samples and the second part of the sequence of samples is a plurality of samples at the end of the sequence of samples. As will be appreciated by those skilled in the art, in a cyclic prefix scheme these will be the same and thus detected in accordance with the invention.

In a preferred set of embodiments, the similarity is computed by applying an autocorrelation function between the first part of the sequence and the second part of the sequence.

In some embodiments, a delayed version of the sequence of samples is generated so that the second part of the sequence is a part that temporally overlays the first part of the sequence in the delayed version of the sequence. The autocorrelation is then performed by: (i) performing a sample-by-sample multiplication of the temporally overlapping parts of the sequence and the delayed version of the sequence to provide a plurality of results and (ii) summing the results.

In some embodiments, the delay is equal to a length of an expected payload of the sequence, wherein the expected payload comprises the sequence without the first part of the sequence and wherein the first part of the sequence is a duplicate of the second part of the sequence.

As mentioned, in a set of preferred embodiments, the radio receiver is adapted to receive an OFDM radio signal, and the comparing comprises comparing a cyclic prefix of the OFDM radio signal with an end part of the OFDM radio signal from where the cyclic prefix was copied from.

In embodiments that use autocorrelation to compute the similarity, and wherein the signal is an OFDM signal, the autocorrelation function is preferably:

$$r_x = \sum_{n=s}^{L+s} x(n) \cdot x(n+N)$$

where
$r_x$=measure of similarity between cyclic prefix and end part of payload
x=sequence of samples
n=sample index
s=start of OFDM symbol
N=length of OFDM payload
L=length of the cyclic prefix For example, within an LTE-M network, the length N of the payload is N=128 and the length L of the cyclic prefix is L=9 or L=10.

In some embodiments, in response to the similarity being less than the similarity threshold, the radio receiver checks how much time has elapsed since an immediately previous attempt at full access, and if the elapsed time is greater than a time threshold, the radio receiver attempts full access to the radio network in any event.

The radio receiver is configured to detect the phase difference between the first part of the sequence and the second part of the sequence to calculate a frequency offset between a frequency of the received radio signal and an expected frequency of the received radio signal. In an OFDM signal, the orthogonality of the OFDM subcarriers depends on the transmitter and receiver using closely matched frequencies. Any difference in frequency results in inter-carrier interference (ICI). Therefore it may be important to detect the frequency offset in an incoming OFDM signal. In accordance with the present invention, by detecting the phase difference between the first part of the sequence (the cyclic prefix) and the second part of the sequence (the last part of the OFDM signal), the frequency offset of the incoming OFDM signal can be calculated using relatively less computational and battery power.

The applicant has appreciated that in some situations, it may be difficult to compare the similarity of parts of an incoming radio signal when the power of the radio signal varies. In cases where similarity does not change but the radio signal power changes, the measured similarity will typically change, not because of a change in similarity, but because of a change in signal power. Therefore, in some embodiments the radio receiver may normalise the similarity before comparing the similarity to the similarity threshold. Normalisation may comprise dividing the similarity with the power of the incoming radio signal.

In some embodiments the radio receiver performs multiple comparisons on a plurality of sequences of samples. In a subset of such embodiments, the receiver then calculates an average similarity between the respective first and second parts of the plurality of sequences of samples. In response to the average being greater than a further similarity threshold, the receiver then attempts full access to the radio network. This is advantageous when there is a low signal to noise ratio in the incoming radio signal as calculating an average similarity of parts of a plurality of sequences will provide a more accurate result than calculating the similarity of parts of a single sequence.

The radio receiver may adaptively set the number of sequences of samples that are used to calculate the average similarity according to a signal-to-noise ratio of the received radio signal.

A further application of the present invention is the detection of radio network type. This may be done by setting parameters associated with the sequence of samples to those of a known radio network type. If the similarity is greater than a similarity threshold, the radio receiver identifies that the radio network type detected is the known radio network type. If the similarity is not greater than the similarity threshold, then the parameters are changed to those associated with a different known radio network type and if the similarity is then greater than the similarity threshold, the radio receiver identifies that the radio network type detected is the different known radio network type.

For example, (i) an expected length of the sequence and (ii) an expected length of the first and second parts of the sequence may be set according to characteristics of a known radio network type. For example, the value of N may be set at N=128 and the value of L may be set at L=9 or L=10, which are characteristic of LTE-M radio networks. If the similarity is subsequently found to be greater than the similarity threshold, the radio network type is identified as LTE-M. If not, then the values of N and L may be changed to those characteristic of a different radio network type, and if the similarity is then found to be greater than the similarity threshold, the radio network type is identified as the different radio network type.

Alternatively or additionally, the radio receiver may detect the radio network type by performing the similarity comparison on parts of a sequence of samples of a radio signal of a frequency corresponding to the known radio network type. If this similarity is greater than a similarity threshold, the radio receiver identifies that the radio network type detected is the known radio network type. If not, then the similarity comparison is performed on parts of a sequence of samples of a radio signal of a frequency corresponding to a different known radio network type, and if the similarity is then greater than the similarity threshold, the radio receiver identifies that the radio network type detected is the different known radio network type.

The above techniques can be used to detect a known radio network type such as WLAN, LTE, LTE-M, LTE-M1 or NBIOT.

BRIEF DESCRIPTION OF DRAWINGS

Certain preferred embodiments of the invention will now be described, by way of example only, with reference to the accompanying drawings, in which.

DETAILED DESCRIPTION

Figure 1:
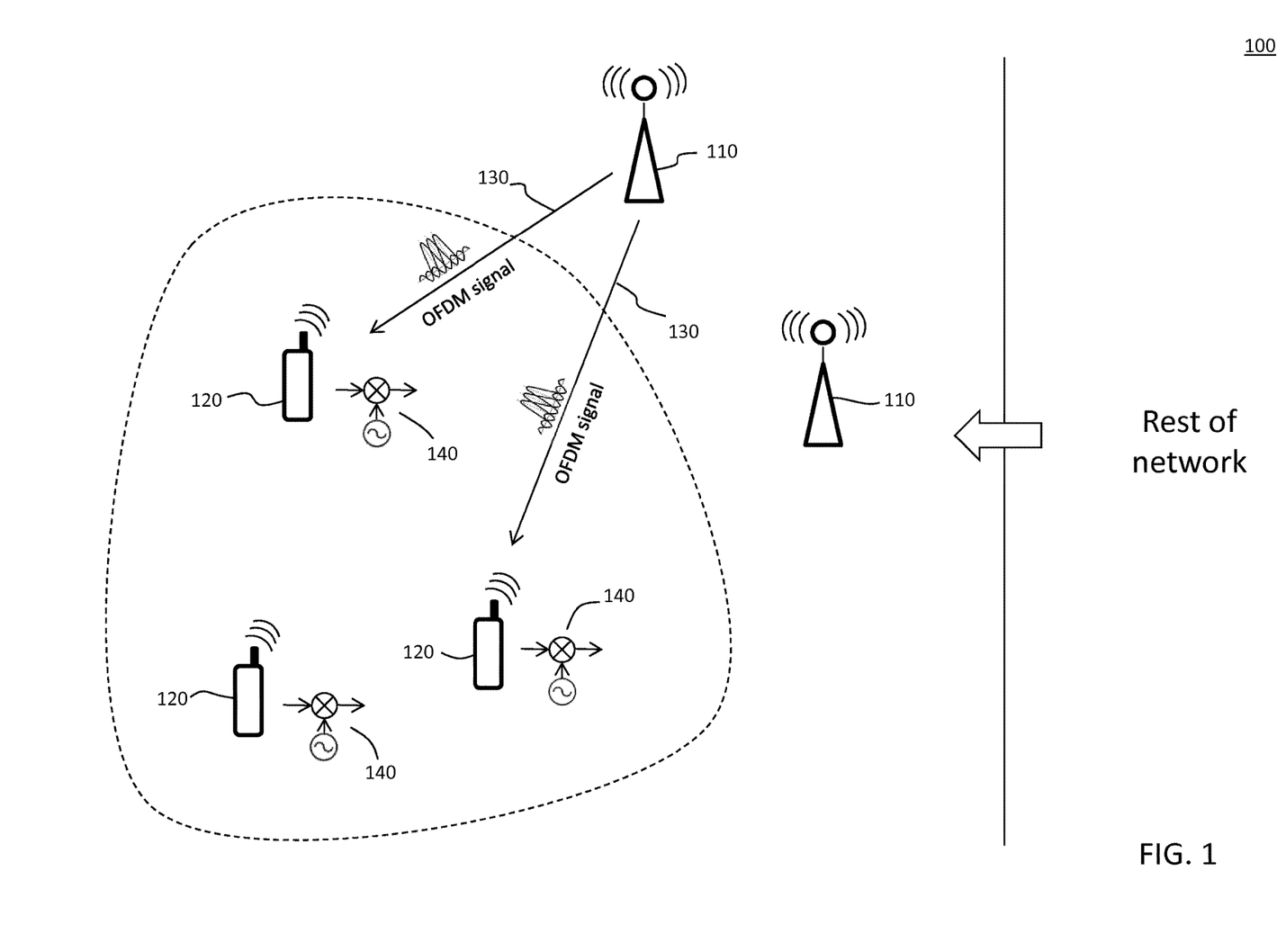
FIG. 1 illustrates a typical radio network, radio signals and radio receivers to which embodiments of the invention may be applied.

FIG. 1 shows a typical radio network 100 comprising base stations 110 and user equipment 120 such as an IoT device wherein each user equipment may comprise a radio receiver for accessing the radio network 100. The rest of the network is not shown in detail. In LTE systems, for example, the base stations 110 may correspond to the eNodeBs of an LTE network, and the radio signal may be modulated using OFDM modulation. In FIG. 1 the frequency spectrum of the orthogonal OFDM carriers are shown as associated with the LTE radio signals 130.

Prior art systems usually use the generation of a local reference signal with a complex correlation scheme and sophisticated frequency offset hypothesis techniques to access a radio signal, as is shown in the detection schemes 140 of each prior art user equipment. As explained earlier, "brute force" trial and error may have to be used to establish the difference between an expected frequency of an incoming signal and the actual received frequency. However, these techniques are expensive in terms of computational requirements and battery power. In the embodiments to be described hereinbelow it will be seen that there is disclosed a low-power radio signal detection scheme that relies on the existence of duplicated parts in radio signals.

OFDM signal modulation schemes generally duplicate the last few samples of an OFDM symbol by copying the last few samples and inserting them at the start of the OFDM symbol.

Figure 2:
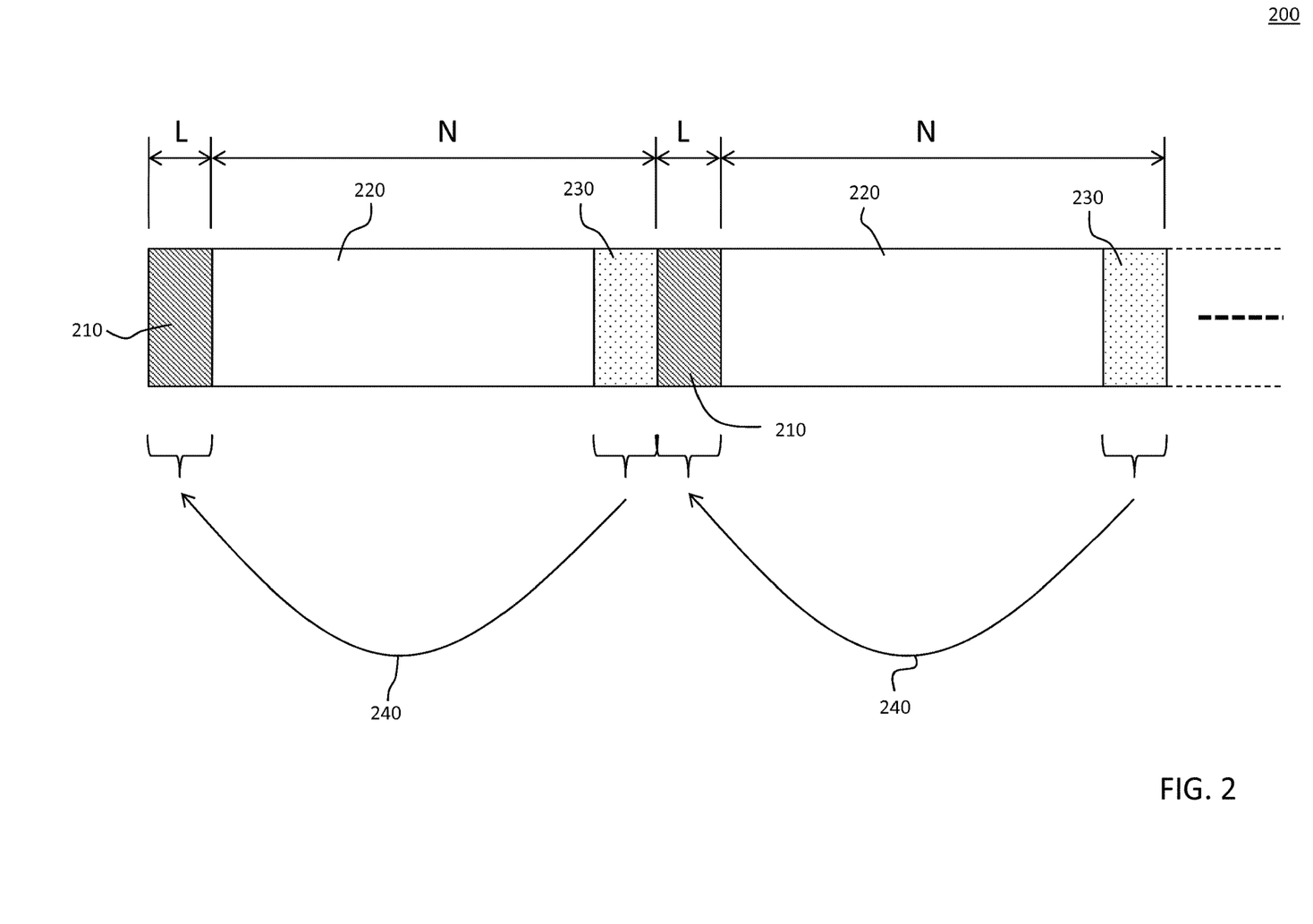
FIG. 2 illustrates a typical OFDM radio signal using a cyclic prefix.

A typical OFDM signal 200 is shown in FIG. 2, showing two consecutive OFDM "symbols". Each OFDM symbol comprises a payload 220. The last few samples 230 of the payload 220 are copied and inserted 240 at the start of the OFDM symbol 210. As the last few samples are inserted at the start of the symbol, they are referred to as a "prefix", and because this happens in every OFDM symbol, the term "cyclic prefix" is used to refer to the samples 210 inserted at the start of the symbol. In FIG. 2, the number of samples in the payload 220 is denoted by "N". The number of samples in the cyclic prefix 210 is denoted by "L". The total length of the OFDM symbol together with the cyclic prefix is therefore N+L.

The cyclic prefix 210 is characteristic of, and so may be used to detect the presence of, an OFDM radio signal. By comparing the first L samples of an incoming radio signal with the last L samples and assessing their similarity, the presence of a cyclic prefix can be detected, and by extension, the presence of an OFDM radio signal is thereby inferred. If there is no similarity or relatively low similarity, then the radio receiver does not identify that an OFDM radio signal has been detected.

In general, any radio signalling scheme that uses duplication of parts of a signal may benefit from application of the present invention. By comparing the similarity of the signal parts with those parts that would correspond to the duplicated signal parts if the detected radio signal were of a signalling scheme of interest, a radio receiver can detect a particular radio signal that is known to use such duplication.

A well-known measure of self-similarity is autocorrelation. Autocorrelation is the measure of the similarity of a signal with a delayed version of itself. As will be appreciated, in signals that utilise a cyclic prefix, the part of the signal from which the cyclic prefix was copied from will in theory exactly match the cyclic prefix itself.

Thus, it is desirable to delay the radio signal so that the duplicated part and the part of the signal from which the duplicate was taken, temporally overlap. An autocorrelation calculation is then achieved by summing the results of a sample-by-sample multiplication of the temporally overlapping parts of the actual signal and the delayed signal.

Figure 3:
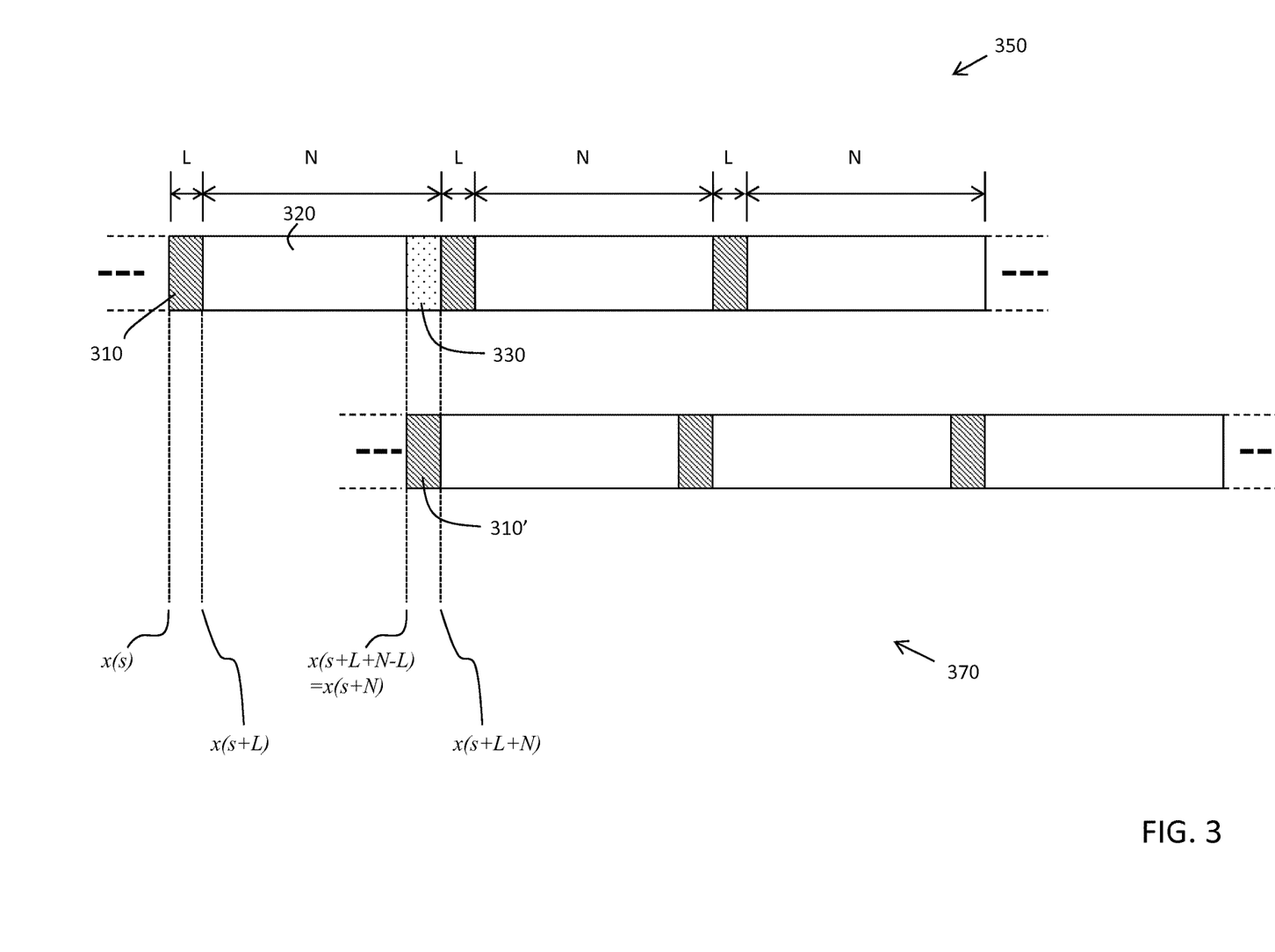
FIG. 3 illustrates a radio signal and a delayed version of the radio signal for use in autocorrelation.

This concept is illustrated in FIG. 3. The original OFDM signal 350 is delayed by the length N of the OFDM payload 320 to produce a delayed signal 370. As the length of the cyclic prefix 310, 310' is L, the total length of each OFDM symbol comprising the payload 320 together with the cyclic prefix is N+L.

If n denotes the sample index, the value of each sample may be denoted as x(n). The first sample of the OFDM signal 350, and thus of the cyclic prefix 310, is denoted in this example as x(s). As the cyclic prefix 310 is L samples long, the last sample of the cyclic prefix is denoted x(s+L). As the number of samples of the OFDM payload 320 is N, the last sample of the OFDM symbol in this illustration is at x(s+L+N). As the cyclic prefix 310 is taken from the last samples of the OFDM symbol, the part of the symbol that is copied starts at x(s+L+N−L) and ends at x(s+L+N). Thus, the duplicated part of the OFDM symbol starts at x(s+N) and ends at x(s+L+N).

Applying a delay of N samples to the OFDM symbol results in the cyclic prefix 310' of the delayed version of the symbol to temporally overlay the last samples of the symbol from which the cyclic prefix was copied from.

It will be appreciated that the example of FIG. 3 may be generalised to the duplication of any part of a radio signal, and that the invention is not limited to the use of the cyclic prefix 310 of an OFDM signal.

The similarity of the temporally overlapping parts of the signal can be calculated using the following formula:

$$r_x = \sum_{n=s}^{L+s} x(n) \bullet x(n+N)$$

where
  $r_x$=measure of similarity between cyclic prefix and end part of payload
  x=sequence of samples
  n=sample index
  s=start of OFDM symbol
  N=length of OFDM payload
  L=length of the cyclic prefix If the received radio signal is not an OFDM signal or a signal that uses duplication of parts, this autocorrelation, or measure of self-similarity between the duplicated parts, will be low. The radio receiver then identifies that no signal of interest is detected.

If on the other hand, the received radio signal is in fact an OFDM signal or a signal that uses duplication of parts, the autocorrelation or self-similarity between the duplicated parts will be high, and a radio signal of interest is thereby detected. The radio can then proceed to attempt full access to the radio network.

Figure 4:
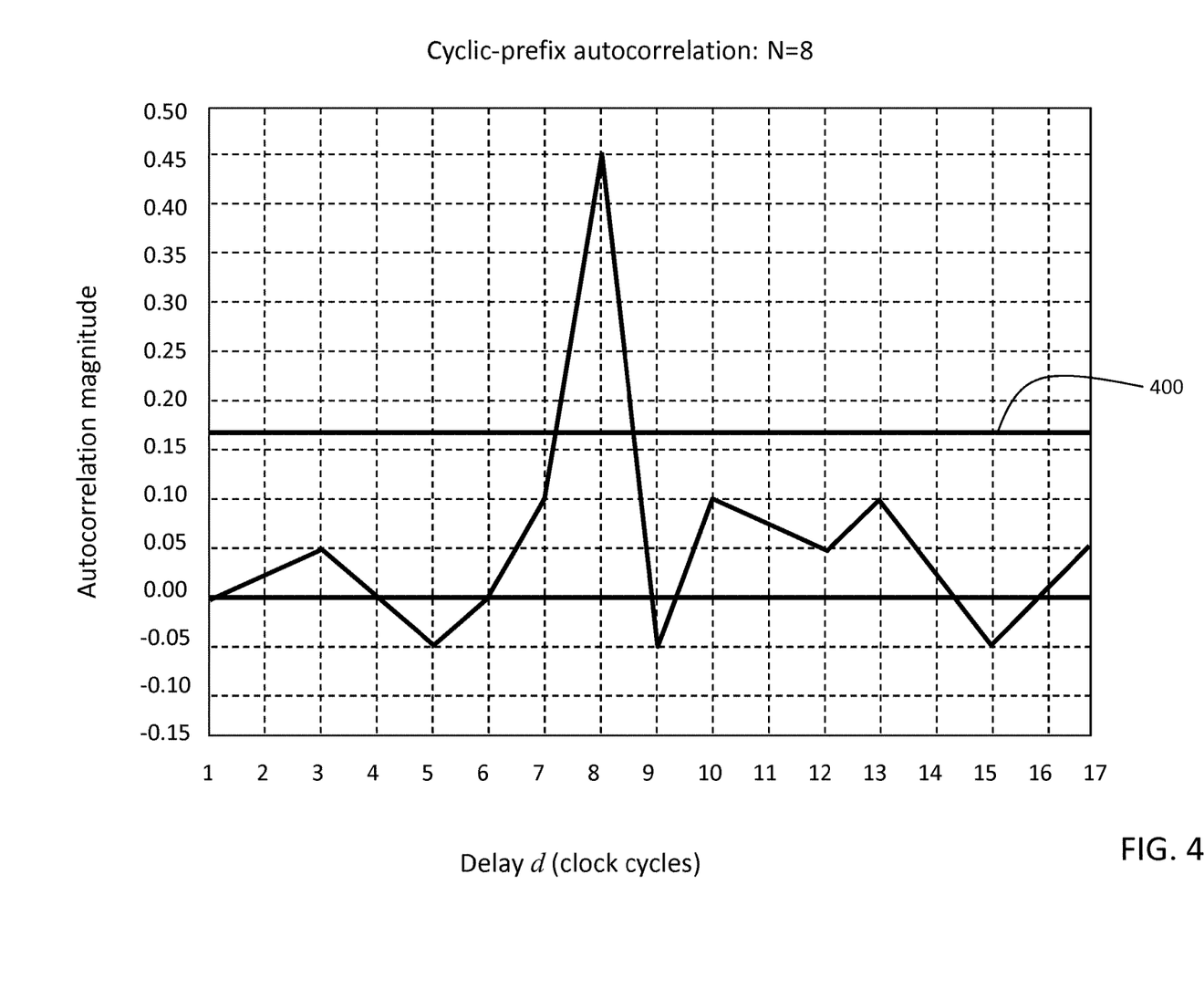
FIG. 4 is a graph showing the autocorrelation of a radio signal with different delays.

In FIG. 4, the autocorrelation or self-similarity of an OFDM signal is shown. In the graph, the horizontal axis represents the delay d of the delayed version 370 of the OFDM signal. The vertical axis represents the magnitude of the autocorrelation of the signal 350 with the delayed version 370 of itself. The graph therefore shows the self-similarity of the signal 350 with a delayed version 370 of itself, for different values of the delay d. When the delay d is equal to the length of the OFDM payload N, then as discussed above, the autocorrelation is measuring the similarity of the cyclic prefix 310 with the end part 330 of the symbol from which the cyclic prefix was copied. As these are theoretically identical, the autocorrelation or self-similarity of the signal will be maximum at delay d=N.

In the example of FIG. 4, the length of the OFDM payload is N=8. As can be seen, the autocorrelation peaks at d=N=8 because it is at this point that the cyclic prefix 310 is being compared with the part of the signal 330 from which the cyclic prefix was copied. At other values of d, the parts of the signal being compared for similarity will be unrelated to each other and so will have a low autocorrelation. By setting the delay of the delayed version 370 of the radio signal to be equal to the length N of the OFDM payload 320, the radio receiver can detect the presence of an OFDM signal when the autocorrelation value crosses a threshold 400. The radio receiver may then proceed to attempt full radio network access.

If the incoming signal does not contain a cyclic prefix (and thus by inference is not an OFDM signal), the autocorrelation will not peak at any value of d. Thus, when the autocorrelation does not cross the threshold 400, the radio receiver determines that no OFDM signal is available. The radio receiver then does not proceed to attempt a full radio network access, saving computational and battery power. The scheme has lower power consumption than traditional radio access schemes that perform full correlation with the incoming signal.

Figure 5:
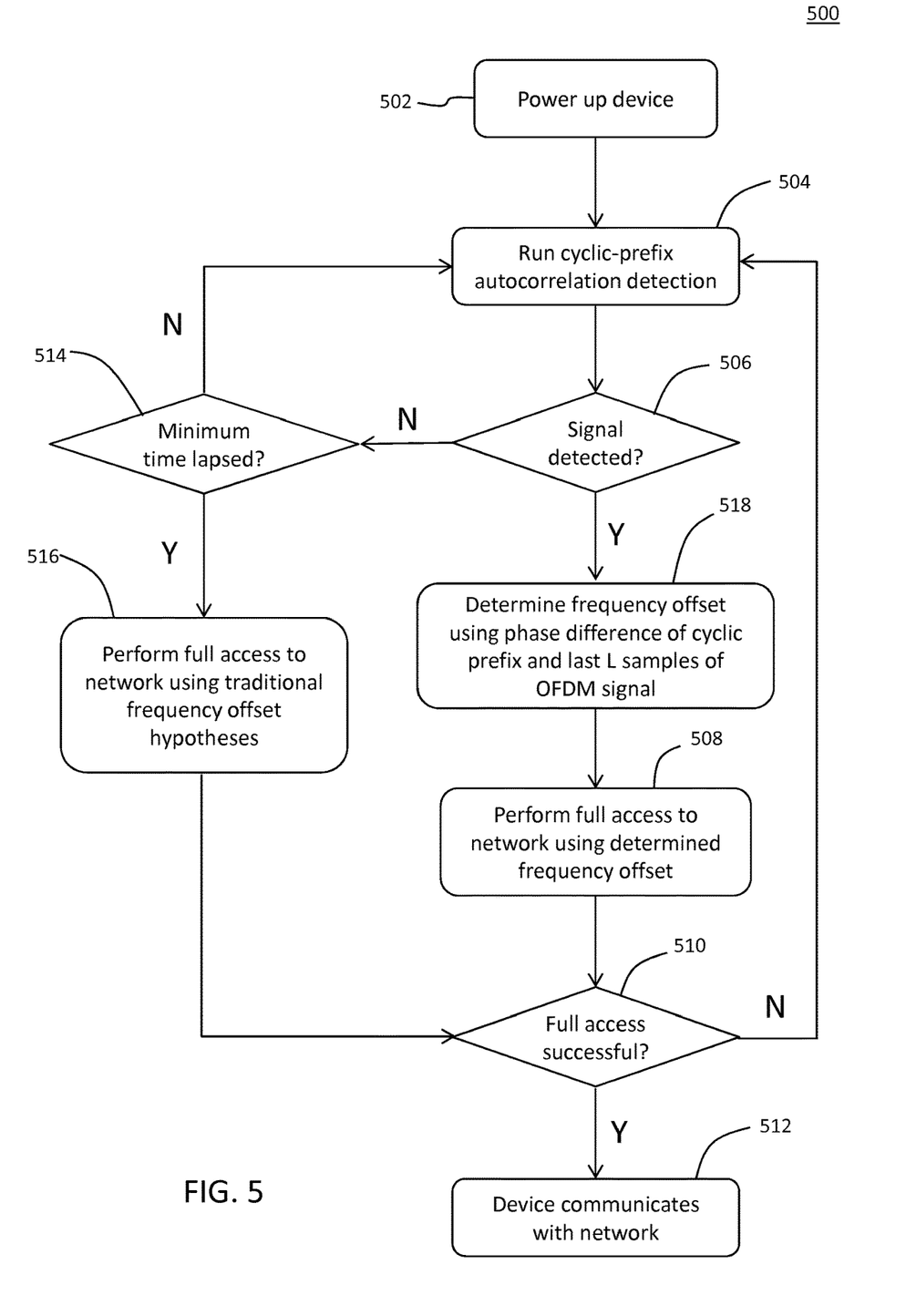
FIG. 5 is a flowchart illustrating a method of low-power radio signal detection in accordance with the invention.

FIG. 5 is a flowchart 500 that shows the steps for low-power detection of useful radio signals in accordance with an embodiment of the present invention. In step 502, the device is powered up. In step 504, cyclic prefix autocorrelation signal detection is performed in accordance with the technique described above. This cyclic prefix 210, 310, 310' may be that used in OFDM modulation schemes. In other embodiments, the autocorrelation of other parts of the signal may be performed, depending on the radio network type.

At step 506, the radio receiver determines if a useful OFDM (or other radio) signal has been detected. If so, then the receiver, at step 518, estimates the frequency offset of the incoming signal by comparing the phase difference of the cyclic prefix 310 with the end part 330 of the OFDM symbol from where the cyclic prefix was copied. Compared to the brute force techniques described above, this is a computationally inexpensive way of determining the frequency offset of incoming OFDM signals which is useful for speedy and low-power recovery of the modulated signal.

Then, the receiver proceeds to attempt full access of the detected radio network at step 508. By using the above described method of determining the frequency offset of the incoming signal, the full network access attempt may be performed using the estimated frequency offset, making the recovery of the modulated signal computationally less expensive.

At step 510, the receiver determines whether the full network access attempt was successful. If so, then the signal acquisition process is complete and the method ends at step 512 with the device communicating with the network.

If, at step 510, the receiver determines that the full network access attempt failed, then the flow branches to step 504 where cyclic prefix autocorrelation signal detection is performed again.

If, at step 506, the receiver determines that no signal was detected using the cyclic prefix autocorrelation detection, then the receiver determines at step 514 the time elapsed since the last full network access attempt was made. If this elapsed time is less than a threshold, then the receiver returns to step 504 and continues periodically running the cyclic prefix autocorrelation radio signal detection method as described above.

If the elapsed time is greater than a threshold, then the receiver performs, at step 516, a full network access attempt even if no signal was detected at step 506.

However, as no OFDM signal was detected, no estimate of the frequency offset may be made. Thus, the full network access attempt proceeds without the advantage of knowing the frequency offset.

In other embodiments, no full network access attempt is made at all when no signal is detected at step 506.

Figure 6:
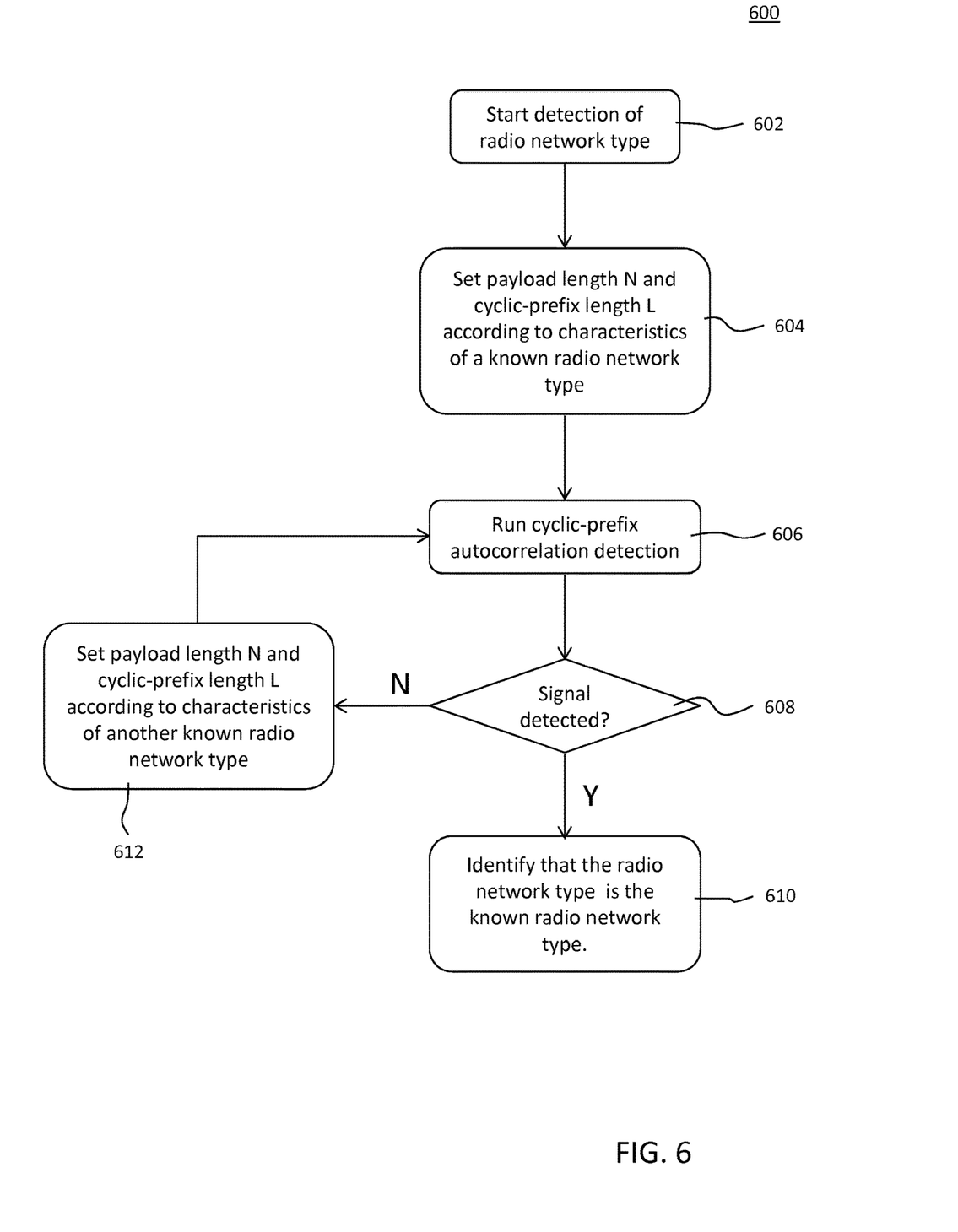
FIG. 6 is a flowchart illustrating a first method of detecting radio network type in accordance with some embodiments.
Figure 7:
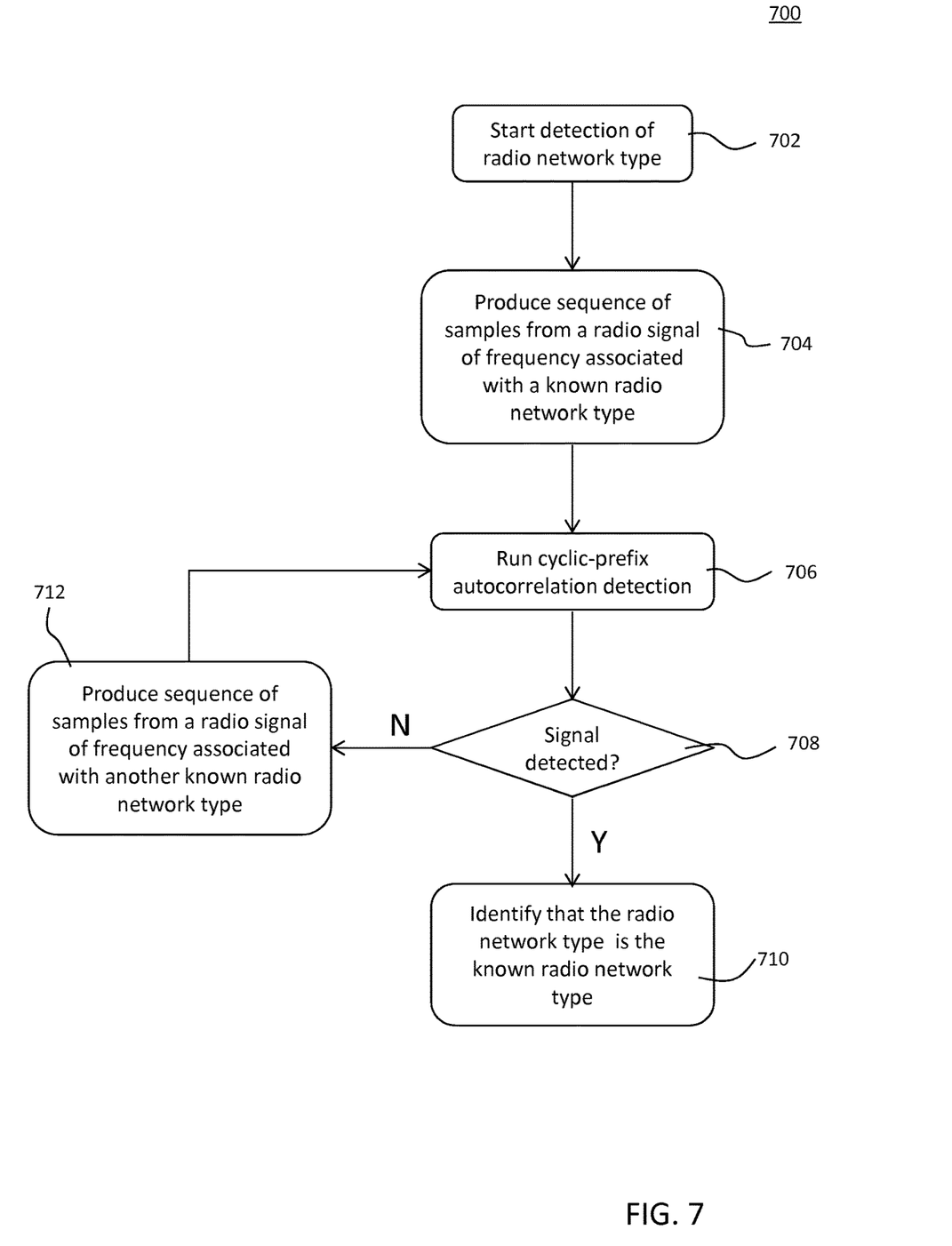
FIG. 7 is a flowchart illustrating a second method of detecting radio network type in some embodiments.

FIGS. 6 and 7 show further embodiments of the present invention wherein the cyclic prefix autocorrelation technique is advantageously used not only to determine the existence of a useful radio signal, but also to determine the radio network type that has been detected.

The technique involves repeated attempts at detecting the radio signal using parameters that are characteristic of respective known radio signal types; if any one of the signal detection attempts is successful, then the radio receiver can identify that the radio network that has been accessed is of the known type corresponding to the parameters used to detect it.

The scheme of method 600 begins at step 602 where the method for detection of radio network type is initiated.

At step 604, the parameters N and L, as described above, are chosen in accordance with values of N and L that are characteristic of a known radio network type being detected. For example, within an LTE-M network, the length N of the payload is N=128 and the length L of the cyclic prefix is L=9 or L=10.

At step 606, the cyclic prefix autocorrelation technique is used to detect a signal with the chosen values for parameters N and L.

At step 608, the receiver determines if a signal has been detected using these parameters. If so, then at step 610 the receiver identifies the detected network as being a network of the known type. If not, then at step 612, the radio receiver may change the parameters N and L to that of a different known network type and perform the steps of 606 and 608 again but with the new set of parameters. In this way the receiver may attempt to detect various known network types using different values for N and L that characterise the different networks.

As an alternative or in addition to method 600, method 700 illustrated in FIG. 7 may be used to determine network type.

The method 700 of FIG. 7 begins at step 702. At step 704 a sequence of samples is taken from a radio signal at a frequency corresponding to a known network type. Cyclic prefix autocorrelation radio signal detection in accordance with the present invention is then performed in step 706. If a signal is detected in step 708, then the receiver determines in step 710 that the detected radio signal is of the known network type.

If on the other hand no signal is detected, the method flows to step 712. In step 712 the receiver may take a sequence of samples from a radio signal at a different frequency corresponding to another known network type, and perform the steps 706 and 708 again, until a radio signal of a desired type is detected.

The method of FIG. 7 determines that a signal is of a particular network type by applying the presently disclosed cyclic-prefix autocorrelation technique at a particular frequency. This method can be combined with the method of FIG. 6 which determines that a signal is of a particular network type by applying the cyclic-prefix autocorrelation technique using a particular value of N and L.

It will be appreciated by those skilled in the art that embodiments of the present invention help address the "container problem" by improving the trade-off between power consumption and speed of network acquisition. In particular they provide a low-power signal detection scheme that can be performed frequently, enabling speedy network acquisition at the same time as using less battery power. Full, computationally expensive, network access only takes place after the initial low-power detection of the radio signal.

The present invention may also be used to determine the radio network type.

The present invention is especially suited for use in radio systems that use OFDM modulation although the skilled person will be aware of other modulation schemes that use the duplication of parts of a signal.

Those skilled in the art will appreciate that the specific embodiments described herein are merely exemplary and that many variants within the scope of the invention as defined in the claims are envisaged.

The invention claimed is:

1. A radio receiver configured to:
   receive a radio signal over a radio network;
   convert at least part of the received radio signal into a sequence of samples;
   compare a first part of the sequence and a second part of the sequence to determine a similarity, wherein the first part and the second part are of equal length; and
   in response to said similarity being greater than a similarity threshold;
   detect a phase difference between the first part of the sequence and the second part of the sequence;
   calculate a frequency offset between a frequency of the received radio signal and an expected frequency of the received radio signal using said phase difference; and
   use said calculated frequency offset to attempt full access to the radio network; and
   in response to the similarity being less than the similarity threshold, to check how much time has elapsed since an immediately previous attempt at full access; and
   if the elapsed time is greater than a time threshold, to attempt full access to the radio network.

2. The radio receiver of claim 1 configured so that said comparison comprises comparing a plurality of samples at a beginning of the sequence of samples and a plurality of samples at an end of the sequence of samples.

3. The radio receiver of claim 1 configured to compute the similarity by applying an autocorrelation function between the first part of the sequence and the second part of the sequence.

4. The radio receiver of claim 3 configured to:
   generate a delayed version of the sequence of samples so that the second part of the sequence is a part that temporally overlays the first part of the sequence in the delayed version of the sequence; and
   perform said autocorrelation function by:
      performing a sample-by-sample multiplication of the temporally overlaying parts of the sequence and the delayed version of the sequence to provide a plurality of results;
      and
      summing the results.

5. The radio receiver of claim 4 configured so that the delay is equal to a length of an expected payload of the sequence, wherein the expected payload comprises the sequence without the first part of the sequence and wherein the first part of the sequence is a duplicate of the second part of the sequence.

6. The radio receiver of claim 1 configured to receive an Orthogonal Frequency Division Multiplexing (OFDM) radio signal comprising:
   a payload including an end part; and a cyclic prefix which is a copy of the end part;
wherein the radio receiver is configured to compare the cyclic prefix with said end part of the payload.

7. The radio receiver of claim 1 configured to normalise the similarity based on a power of the received radio signal before determining if the similarity is greater than the similarity threshold.

8. The radio receiver of claim 1 configured to:
perform multiple comparisons on a plurality of sequences of samples;
calculate an average similarity between respective first and second parts of the plurality of sequences of samples; and
in response to the average similarity being greater than a further similarity threshold, attempt full access to the radio network.

9. The radio receiver of claim 8 configured to adaptively set a number of sequences of samples that are used to calculate the average similarity according to a signal-to-noise ratio of the received radio signal.

10. The radio receiver of claim 1 configured to determine a radio network type corresponding to the received radio signal by:
prior to performing said comparison, setting:
(i) an expected length of the sequence and
(ii) an expected length of the first and second parts of the sequence according to characteristics of a known radio network type; and
if the similarity is greater than the similarity threshold, the radio receiver determining that the radio network type corresponding to the received radio signal is the known radio network type;
if the similarity is not greater than the similarity threshold, changing the expected length of the sequence and the expected length of the first and second parts of the sequence according to characteristics of a different known radio network type and performing said comparison again, and if the similarity is then greater than the similarity threshold, determining that the radio network type corresponding to the received radio signal is the different known radio network type.

11. The radio receiver of claim 1 configured to determine a radio network type corresponding to the received radio signal by:
performing the similarity comparison on parts of a sequence of samples of a radio signal of a frequency corresponding to a known radio network type; and
if the similarity is greater than the similarity threshold, the radio receiver determining that the radio network type corresponding to the received radio signal is the known radio network type;
if the similarity is not greater than the similarity threshold, performing the similarity comparison on parts of a sequence of samples of a radio signal of a frequency corresponding to a different known radio network type, and if the similarity is then greater than the similarity threshold, determining that the radio network type corresponding to the received radio signal is the different known radio network type.

12. A method of detection of a radio signal, said method comprising:
receiving a radio signal over a radio network;
converting at least part of the received radio signal into a sequence of samples;
comparing a first part of the sequence and a second part of the sequence to determine a similarity, wherein the first part and the second part are of equal length; and
in response to said similarity being greater than a similarity threshold:
detecting a phase difference between the first part of the sequence and the second part of the sequence;
calculating a frequency offset between a frequency of the received radio signal and an expected frequency of the received radio signal using said phase difference; and
using said calculated frequency offset to attempt full access to the radio network; and
in response to the similarity being less than the similarity threshold, checking how much time has elapsed since an immediately previous attempt at full access; and
if the elapsed time is greater than a time threshold, attempting full access to the radio network.

13. The method of claim 12 wherein said comparing comprises comparing a plurality of samples at a beginning of the sequence of samples and a plurality of samples at an end of the sequence of samples.

14. The method of claim 12 further comprising computing the similarity by applying an autocorrelation function between the first part of the sequence and the second part of the sequence.

15. The method of claim 14 further comprising:
generating a delayed version of the sequence of samples so that the second part of the sequence is a part that temporally overlays the first part of the sequence in the delayed version of the sequence; and
performing said autocorrelation function by:
performing a sample-by-sample multiplication of the temporally overlapping overlaying parts of the sequence and the delayed version of the sequence to provide a plurality of results;
and
summing the results.

16. The method of claim 15 wherein the delayed version is delayed by a delay that is equal to a length of an expected payload of the sequence, wherein the expected payload comprises the sequence without the first part of the sequence and wherein the first part of the sequence is a duplicate of the second part of the sequence.

17. The method of claim 12 wherein said received radio signal is an Orthogonal Frequency Division Multiplexing (OFDM) radio signal comprising:
a payload including an end part; and
a cyclic prefix which is a copy of the end part;
wherein said comparing comprises comparing the cyclic prefix with said end part of the payload.

18. The method of claim 12 further comprising normalising the similarity based on a power of the received radio signal before determining if the similarity is greater than the similarity threshold.

19. The method of claim 12 further comprising:
performing multiple comparisons on a plurality of sequences of samples;
calculating an average similarity between the respective first and second parts of the plurality of sequences of samples; and
in response to the average similarity being greater than a further similarity threshold, attempting full access to the radio network.

20. The method of claim 19 further comprising adaptively setting a number of sequences of samples that are used to calculate the average similarity according to a signal-to-noise ratio of the received radio signal.

21. The method of claim 12 further comprising determining a radio network type corresponding to the received radio signal by:
- prior to performing said comparison, setting:
  - (i) an expected length of the sequence and
  - (ii) an expected length of the first and second parts of the sequence according to characteristics of a known radio network type; and
- if the similarity is greater than the similarity threshold, determining that the radio network type corresponding to the received radio signal is the known radio network type;
- if the similarity is not greater than the similarity threshold, changing the expected length of the sequence and the expected length of the first and second parts of the sequence according to characteristics of a different known radio network type and performing said comparison again, and if the similarity is then greater than the similarity threshold, determining that the radio network type corresponding to the received radio signal is the different known radio network type.

22. The method of claim 12 further comprising determining a radio network type corresponding to the received radio signal by:
- performing the similarity comparison on parts of a sequence of samples of a radio signal of a frequency corresponding to a known radio network type; and
- if the similarity is greater than the similarity threshold, the radio receiver determining that the radio network type corresponding to the received radio signal is the known radio network type;
- if the similarity is not greater than the similarity threshold, performing the similarity comparison on parts of a sequence of samples of a radio signal of a frequency corresponding to a different known radio network type, and if the similarity is then greater than the similarity threshold, determining that the radio network type corresponding to the received radio signal is the different known radio network type.

\* \* \* \* \*